United States Patent [19]
Dalstein

[11] Patent Number: 5,724,247
[45] Date of Patent: Mar. 3, 1998

[54] METHOD OF GENERATING A SIGNAL INDICATING THE DIRECTION OF A SHORT-CIRCUIT

[75] Inventor: Thomas Dalstein, Berlin, Germany

[73] Assignee: Siemens Aktiengesellschaft, München, Germany

[21] Appl. No.: 615,297

[22] PCT Filed: Sep. 20, 1994

[86] PCT No.: PCT/DE94/01151

§ 371 Date: May 24, 1996

§ 102(e) Date: May 24, 1996

[87] PCT Pub. No.: WO95/09465

PCT Pub. Date: Apr. 6, 1995

[30] Foreign Application Priority Data

Sep. 27, 1993 [DE] Germany ............ 43 33 259.5

[51] Int. Cl.$^6$ .................................................. G01R 31/00
[52] U.S. Cl. ........................................... 364/483; 324/521
[58] Field of Search ........................... 364/481, 483; 324/521, 512, 522, 76.15; 307/2, 8; 340/825.06, 825.16; 395/21, 22, 23

[56] References Cited

U.S. PATENT DOCUMENTS

| | | | |
|---|---|---|---|
| 4,591,992 | 5/1986 | Yamaura | 364/483 |
| 5,159,660 | 10/1992 | Lu et al. | 395/22 |
| 5,576,618 | 11/1996 | Calero | 324/76.15 |

FOREIGN PATENT DOCUMENTS

| | | |
|---|---|---|
| 24 30 780 | 4/1975 | Germany. |
| 29 07 682 | 6/1983 | Germany. |

OTHER PUBLICATIONS

Proceedings of Canadian Conference On Electrical and Computer Engineering, Bd. 1, 17, Sep. 1993, Vancouver CA, pp. 205–208, Sidhu "An Artificial Neural Network Based Directional Discriminator For Protecting Transmission Lines".

IEEE Transactions On Power Systems, Bd. 7, Nr. 1, May 1992, New York, US, pp. 812–819, Kandil "Fault Identification In An AC–DC Transmission System Using Neural Networks".

Proceedings of the 27th Intersociety Energy Conversion Engineering Conference, Bd. 1, Aug. 1992, San Diego, US, pp. 1191–1196, Fernando "High Impedance Fault Detection Using Artificial Neural Network Techniques".

Muller et al., Selekivschutz Elektrischer Anlagen, Aug. 1990, pp. 73–76.

Primary Examiner—Emanuel T. Voeltz
Assistant Examiner—Thomas Peeso
Attorney, Agent, or Firm—Kenyon & Kenyon

[57] ABSTRACT

A process for generating a direction signal indicating the direction of a short-circuit current in a power transmission line to be monitored. To reliably produce a direction signal even in the event of a short-circuit occurring in the proximity of the control point, each derived current and voltage signal ($J_R(t)$) is separately sampled and normalized to obtain different normalized sample values ($J_{Rn}$). Taking the triggering reference values ($S_n$) into account, difference values ($\Delta i_R(t)$, $\Delta i_R(t-1)$, $\Delta i_R(t-2)$, $\Delta i_R(t-3)$) are formed. The difference values ($\Delta i_R(t)$, $\Delta i_R(t-1)$, $\Delta i_R(t-2)$, $\Delta i_R(t-3)$) of a series ($S_{iR}$) are supplied to different input neurons of a suitably trained neural network successively and simultaneously with the difference values corresponding to the same times of the other series ($S_{iS}$, $S_{iT}$, $S_{uR}$, $S_{uT}$). In the event of a short-circuit in one direction (forward direction), the output signal ($S_m$) of the output neuron exceeds a predefined upper threshold value, while, in the event of a short-circuit in the reverse direction, the output signal ($S_m$) remains below a predefined lower threshold value. The different magnitudes of the output signal ($S_m$) are used for generating the corresponding direction signals.

16 Claims, 2 Drawing Sheets

METHOD OF GENERATING A SIGNAL INDICATING THE DIRECTION OF A SHORT-CIRCUIT

This application is a 371 of International application PCT/DE94/01151 filed Sep. 20, 1994.

FIELD OF THE INVENTION

The present invention relates to a method for generating a signal indicating the direction of a short-circuit current in relation to a control point on an electric transmission line to be monitored.

BACKGROUND OF THE INVENTION

A method for generating a signal indicating the direction of a short-circuit current is described in the publication "An Artificial Neural Network Based Directional Discriminator for Protecting Transmission Lines" in "Proc. of the Canadian Conference on Electrical and Computer Engineering," 1993, Vol. 1, pp. 205–208. In the process described therein, sample values, formed from current and voltage signals derived from currents and voltages of a power transmission line to be monitored, are supplied to the input of a neural network. For the neural network to be able to recognize the direction of a short-circuit current, the neural network is previously taught with suitable sample values. A neural network thus taught is capable of determining a direction immediately after the occurrence of a short-circuit with approximately ten sample values.

SUMMARY OF THE INVENTION

The present invention provides a method for generating a signal indicating the direction of a short-circuit current in relation to a control point on an electric transmission line to be monitored in which current and voltage signals derived from phase currents and phase voltages of the power transmission line are used for generating the direction signal, wherein each derived current and voltage signal is sampled and normalized separately for each phase to obtain different series of normalized sample values, and in which signals are supplied to a neural network consisting of an input layer with input neurons, a hidden layer, and an output layer with one output neuron, and which is taught by coaching through simulation of different short-circuits at different points of the power transmission line to be monitored, so that the signal of the output neuron assumes one predefined value for a short-circuit in one direction and another predefined value for a short-circuit in the other direction.

The present invention further provides for forming a triggering reference value, obtained from the sample value immediately previous to triggering and, in the event of triggering, from consecutively generated triggering reference values for each current sample value, and, in the event of triggering, the triggering reference value corresponding to the same time of this sample value is subtracted from the current sample values of the different series and thus a series of difference values is formed for each phase; the difference values of all series are simultaneously supplied to different input neurons of the neural network, which has a second hidden layer and which is taught by coaching through simulation of different short-circuits at different points of the power transmission line to be monitored, so that the signal of the output neuron exceeds a predefined upper threshold in the event of a short-circuit in one direction and remains below a predefined lower threshold in the event of a short-circuit in the other direction; the signal of the output neuron is examined for its magnitude and, when a threshold value is reached, the direction signal is generated.

One advantage of the method according to the present invention is that, after triggering, the aforementioned difference values are supplied to the input neurons of the neural network, the difference values having been ultimately produced only with triggering reference values obtained from consecutively formed triggering reference values.

An advantageous embodiment of the method according to the present invention provides for the use of a neural network for detecting a short-circuit between the power transmission line to be monitored and another power transmission line running parallel to it; the said neural network is additionally taught through simulation of short-circuits at different short-circuit points between the two power transmission lines so that the signal of the output neuron in the event of a short-circuit of this type assumes a predefined intermediate value between the upper and lower threshold value while, in the event of a signal of the output neuron in the magnitude of the intermediate value, a parallel fault signal indicating a short-circuit between the power transmission lines is generated. The magnitude of the parallel signal provides an indication regarding the direction of the parallel fault in relation to the control point.

Such short-circuits cannot be detected at all with the prior art methods and circuit arrangements for generating a direction signal, so that this embodiment of the method according to the invention first provides the possibility of determining short circuits of this type in both directions from the control point.

In the method according to the present invention, triggering reference values generated in different manners in the event of a short-circuit can be used. For example, triggering reference values obtained through an electronic overcurrent relay supplying a current-proportional measured value can be used. To achieve a process with particularly high accuracy and reliability, it is, however, considered advantageous according to the present invention if a triggering device, wherein a triggering neural network with one input layer, one hidden layer and one output layer with one output neuron is assigned to each phase conductor of the power transmission line to be monitored, is used for producing triggering reference values to form difference values from the derived current signals, with each triggering neural network having a triggering behavior taught by coaching through current simulation under different load conditions of the power transmission line to be monitored; at the same time, successively sampled and normalized values of the current in each corresponding phase conductor of the power transmission line to be monitored are applied to the different neurons of the input layer of each triggering neural network, and a subsequently sampled and normalized value of the current in the respective phase conductor is compared to the output signal of the output neuron, as well as the output signal of the output neuron, present over the output signal of the output neuron of the respective triggering neural network when the normalized comparative value of the current in the respective phase conductor is exceeded, and the output signals of the output neurons of the other triggering neural network simultaneously present are used as triggering reference values of the output signal of the output neuron.

Furthermore, it is considered advantageous if another triggering device is used for producing triggering reference values to form difference values from the derived voltage signals, in which triggering device another triggering neural network with one input layer, one hidden layer and one output layer with one output neuron is assigned to each phase conductor of the power transmission line to be monitored, with each additional triggering neural network having a behavior taught by coaching through voltage simulation under different load conditions of the power transmission line to be monitored. At the same time, successively sampled, normalized values of the voltage on the respective phase conductor of the power transmission line are applied to the different neurons of the input layer of each additional triggering neural network, and a subsequently sampled normalized value of the voltage on the corresponding phase conductor is compared to the output signal of the output neuron of the corresponding additional triggering neural network; the output signal of the output neuron of the additional triggering neural network, present over the output signal of the output neuron of the corresponding triggering neural network when the normalized comparative value of the current is exceeded in the corresponding phase conductor and/or present below the output signal of the output neuron of the corresponding additional neural network when it remains below the normalized comparative value of the voltage of the same phase conductor, and the output signals of the output neurons of the other additional triggering neural networks present at the same time are used as a triggering reference value.

In view of a pre-defined reliability of the process according to the present invention and its relatively simple design, it is considered advantageous if neural networks with an input layer having five neurons and a hidden layer with five neurons are used.

Furthermore, it is considered advantageous if a neural network with 24 input neurons of a first hidden layer and a second hidden layer with 12 neurons is used. This allows the teaching costs and the time spent for implementing the process according to the invention to be reduced.

DETAILED DESCRIPTION

Figure 1:
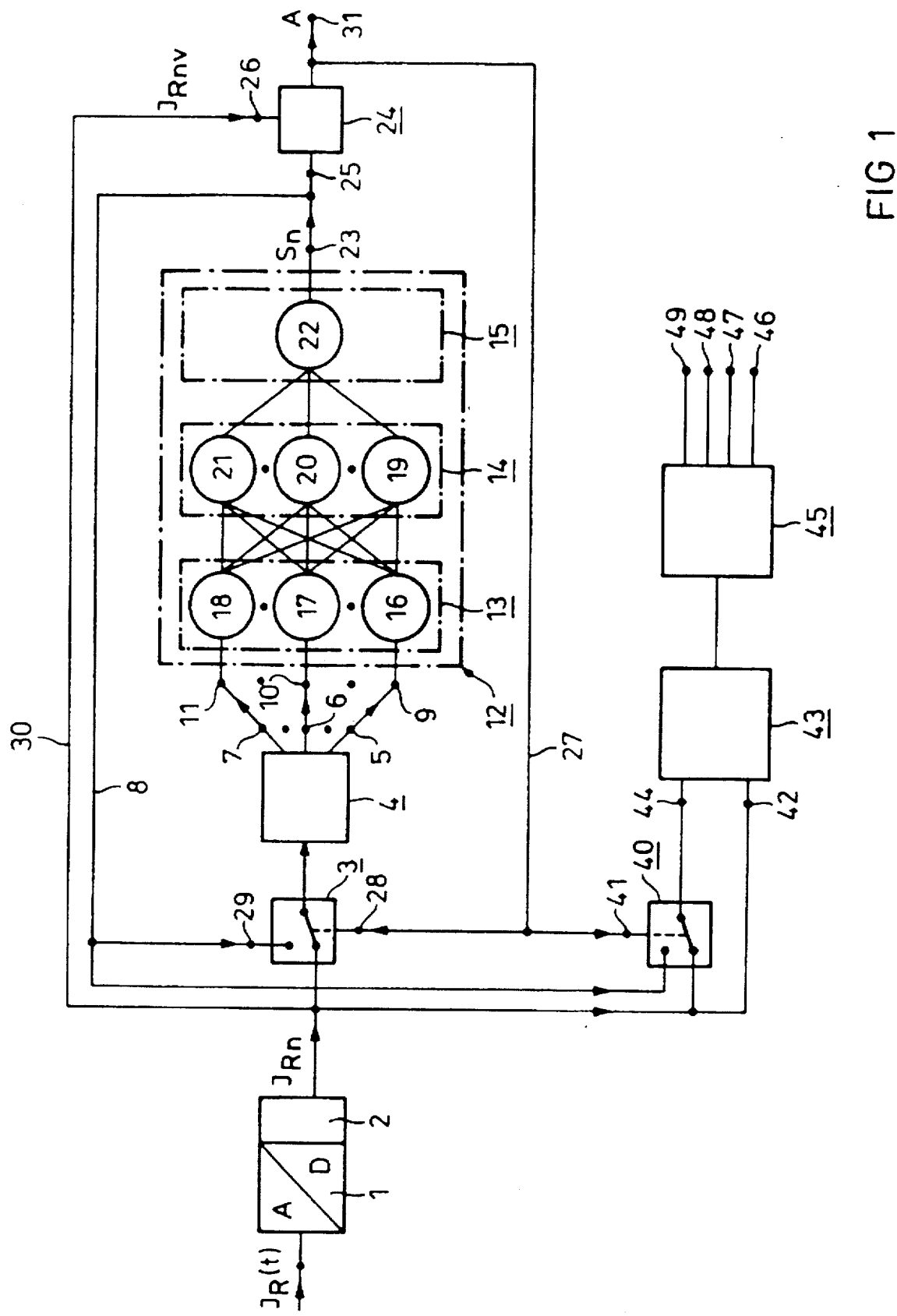
FIG. 1 shows an arrangement for obtaining a triggering reference value and difference values of a series.

A current $J_R(t)$, which, as a derived current signal, is proportional to the current in phase conductor R of a power transmission line to be monitored (not illustrated), is supplied to the input of the arrangement represented in FIG. 1. Current signal $J_R(t)$ is sampled in an analog-digital transducer 1 and the sampled current values are converted into digital values. In a normalizer 2 connected downstream, the sampled current values are converted to normalized values $J_{Rn}(t)$. The sampled normalized values $J_{Rn}(t)$ are supplied, through an electronic transfer switch 3, to a multiplexer 4 connected downstream and having five outputs, of which outputs 5, 6 and 7 are illustrated. Multiplexer 4 is equipped with time delay modules so that the sample values $J_{Rn}(t)$ of the current appear simultaneously at outputs 5 through 7, while the simultaneous appearance of the values with different delays at outputs 5 through 7 occurs simultaneously with the emission of an additional sample value $J_{Rn}$ by normalizer 2 through a conductor 8.

Five inputs 9, 10 and 11 (only three inputs are shown) of a neural network 12, consisting of an input layer 13, a hidden layer 14 and an output layer 15, are connected to outputs 5 through 7 of multiplexer 4. Neural network 12 has five neurons in its input layer 13, of which three neurons 16, 17 and 18 are illustrated. Hidden layer 14 also contains five neurons, of which three neurons 19, 20 and 21 are shown, while output layer 15 is provided with only a single neuron, output neuron 22. In this case, neural network 12 is taught a predefined triggering behavior according to Rumelhart's backpropagation algorithm, with currents $J_R(t)$ obtained for different load and fault conditions by simulation with a network model corresponding to the power transmission network to be monitored. In this case, the NETOMAC network model, described in detail in "Elektrizitätswirtschaft," 1979, Vol. 1, pp. 18–23, can be used.

A comparator 24, whose one input 25 is supplied with the output signal of output neuron 22, is connected downstream from an output 23 of output layer 15, i.e., of neural network 12. The output of normalizer 2 is directly connected to another input 26 of comparator 24 via conductor 8, so that a sampled, normalized value of the current $J_R(t)$ is supplied as a comparative value to comparator 24 through input 26, following the last sampled normalized value supplied to the multiplexer.

As further shown in FIG. 1, the output of comparator 24 is also connected to a control input 28 of electronic switch 3 through control line 27. A signal input 29 of switch 3 is connected to output neuron 22 via a signal line 30.

The arrangement illustrated in FIG. 1 operates so that current signal $J_R(t)$ is sampled in analog-digital converter 1 and the sample values are converted into digital values. The digital sample values are normalized in the normalizing module 2 connected downstream and transmitted as sampled, normalized values $J_{Rn}(t)$ to multiplexer 4 through the enabled switch 3. The multiplexer 4 supplies the successively sampled, normalized values $J_{Rn}(t)$ of current $J_R(t)$ due to the internal time delay module through its outputs 5 through 7 and inputs 9 through 11 to neural network 12, which then produces a corresponding normalized output signal $S_n$ at its output 23. The other sampled, normalized value produced after the five sampled, normalized values of current signal $J_R(t)$ is also supplied to comparator 24, through conductor 8 and input 26 at the same time as comparative value $J_{Rnv}$, where $J_{Rnv}$ is compared to output signal $S_n$ of neural network 12, whereupon a triggering signal A is generated at output 31 of comparator 24. The currents in the additional phase conductors of the power transmission line are detected in a similar manner. For this purpose, an arrangement illustrated in FIG. 1 is used, so that triggering signals may be produced at the outputs of these additional arrangements. These triggering signals can be analyzed in OR modules to generate general triggering. The output signal of the general triggering then represents the triggering signal for the respective selective protection device, which can be, for example, a remote protection device.

If a triggering signal A is produced at output 31, electronic switch 3 is switched via control line 27, connecting the output, i.e., the output signal $S_n$ of output neuron 22 to the input of multiplexer 4. Multiplexer 4 switches output signal $S_n$ and two of the three previously sampled values to neural network 12. The process is repeated two more times, until finally only (successively generated) output signals $S_n$ of multiplexer 4 are processed and forwarded. This is important for the actual determination of fault direction in the power transmission line discussed in detail below.

As can be further seen in FIG. 1, the sampled, normalized values $J_{Rn}$ of current signal $J_R(t)$ are also supplied to another electronic switch 40, whose control input 41 is provided with triggering signal A from output 31. A differentiator 43, with an input 42 connected to normalizer 2 and an input 44 connected to the output of additional electronic switch 40, is connected downstream from the additional electronic switch 40. The input 44 is thus supplied with output signal $S_n$ of triggering neural network 12 after the appearance of a trigger signal A. The current difference values are determined in differentiator 43 by subtracting the current output signal $S_n$ from each sampled, normalized value $J_{Rn}$. The output of differentiator 43 is connected to another multiplexer 45 with time delay modules, which is provided with outputs 46, 47, 48, and 49. If no triggering signal A is present, sampled normalized values $J_{Rn}$ are supplied to inputs 42 and 44 of differentiator 43.

The arrangement of FIG. 1 operates in relation to the above-described components so that after the appearance of a triggering signal A at input 41, the additional electronic switch 40 is actuated, whereupon output signal $S_n$ and the subsequently formed additional output signals $S_{n1}$ through $S_{n3}$ are successively supplied to differentiator 43. Differentiator 43 produces a series $S_{iR}$ of difference values:

$$\Delta i_R(t) = J_{Rn1} - S_n$$

$$\Delta i_R(t-1) = J_{Rn2} - S_{n1}$$

$$\Delta i_R(t-2) = J_{Rn3} - S_{n2}$$

$$\Delta i_R(t-3) = J_{Rn4} - S_{n3}.$$

This series $Si_R$ is assigned to the derived current signal $J_R(t)$.

Figure 2:
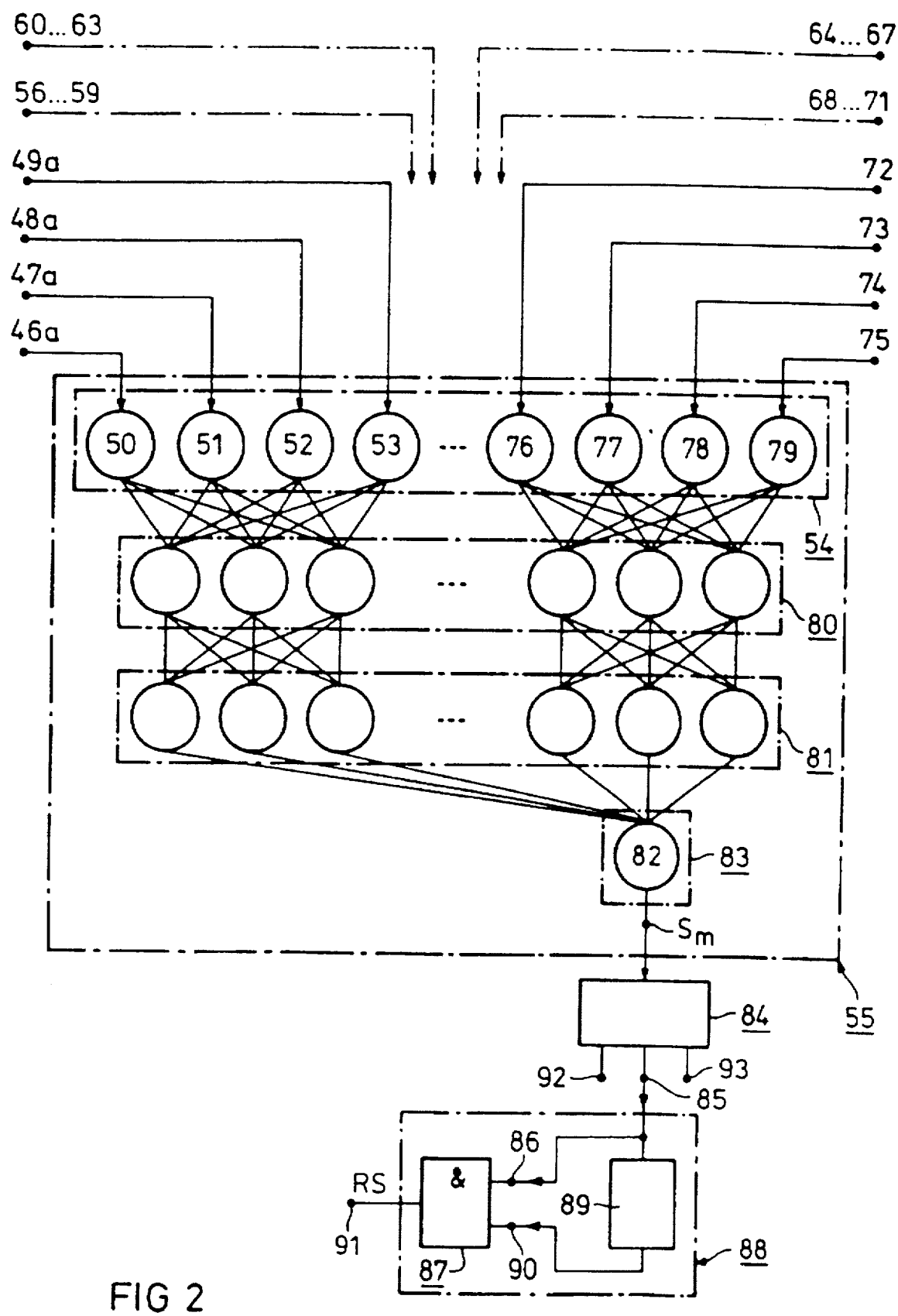
FIG. 2 shows a neural network supplied with the series of difference values for generating a direction signal.

As shown in FIG. 2, the series $Si_R$ of difference values $\Delta i_R(t)$ through $\Delta i_R(t-3)$ is applied simultaneously to inputs 46a, 47a, 48a and 49a of four input neurons 50, 51, 52 and 53, respectively, of an input layer 54 of a neural network 55 through outputs 46 through 49 of multiplexer 45. Four other input neurons (not illustrated) of input layer 54 are connected to the respective outputs of other multiplexers similar to multiplexer 45 of FIG. 1 through their inputs 56 through 59 and 60 through 63, schematically represented in FIG. 2 in the form of a single input. Thus a series $S_{iS}$ of difference values, formed according to the above paradigm from an additional derived current signal $J_S(t)$, corresponding to the phase current in phase S of the power transmission line to be monitored, can be used for processing. The same applies to another series $S_{iT}$ of difference values corresponding to a current $J_T(t)$.

The same applies to the phase voltages on the power transmission line to be monitored, in that difference values of a series $S_{uT}$, formed using one of the voltage signals derived from the voltage of phase T, are supplied to neural network 55 through inputs 64 through 67, symbolically represented by a single input in FIG. 2. A series $S_{uS}$ of difference values obtained from the voltage of phase S is applied to additional inputs 68 through 71. Difference values of a series $S_{uR}$, also formed with an arrangement according to FIG. 1 by applying the voltage of phase R to the input of such an arrangement, are applied to additional inputs 72, 73, 74, and 75.

Thus, in the embodiment of FIG. 2, the input layer of neural network 55 comprises a total of 24 input neurons, of which the last four neurons 76, 77, 78 and 79 are connected to inputs 72 through 75, respectively.

In addition to input layer 54, neural network 55 contains a first hidden layer 80 with 20 neurons and another hidden layer 81 with 12 neurons, with the neurons of each hidden layer being connected to all the input neurons and all the neurons of the following hidden layer. On the other hand, all the neurons of the second hidden layer 81 are connected to a single output neuron 82 of output layer 83.

Neural network 55 is trained by coaching through simulation of different load conditions for different cases of short-circuit, so that in the event of a short-circuit in one direction from the control point (i.e., the forward direction) signal $S_m$ at the output of output neuron 82 exceeds the normalized value of 0.8. In the event of a short-circuit in the other direction from the control point (i.e., the reverse direction), signal $S_m$ remains below the normalized value 0.2 as a result of the same teaching process.

The neural network can also be taught by coaching with the aforementioned NETOMAC network model as also described above.

A comparator 84, set to a first upper threshold value of 0.8 and a lower threshold value of 0.2, is connected downstream from neural network 55. If output signal $S_m$ assumes a value that is greater than 0.8 (i.e., fault in the forward direction), a signal appears at an output 85 of comparator 84 which is supplied directly to an input 86 of an AND module 87 of an analyzer 88, as well as to another input 90 of AND module 87 through time delay module 89, with a time delay equal to the length of a sampling step. This results in a direction signal appearing at output 91 of AND module 87 only after two consecutive signals at output 85 of comparator 84, indicating a short-circuit in the forward direction. Thus, increased reliability of this conclusion is achieved.

If output signal $S_m$ of output neuron 82 of neural network 55 assumes a value smaller than 0.2, a signal appears at another output 92, indicating a fault in the reverse direction. Subsequently, after the appearance of two such signals, a fault in the reverse direction is signaled by an analyzer similar to device 88.

As can be further seen in FIG. 2, comparator 84 has another output 93, used for generating a parallel fault signal. This parallel fault signal indicates a short-circuit between two power transmission lines running parallel to each other and is called upon when comparator 84 detects an output signal $S_m$ of output neuron 82 having an approximate value of 0.5. If the parallel fault is in the forward direction, the intermediate value is greater than 0.5. For such a fault in the reverse direction, the intermediate value is smaller than 0.5.

What is claimed:

1. A method for generating a direction signal indicating the direction of a short-circuit current in relation to a control point on a power transmission line to be monitored, the method comprising the steps of:

sampling current and voltage signals derived from phase currents and phase voltages of the power transmission line;

normalizing the sampled current and voltage signals to obtain a series of normalized sample values for each phase;

generating a triggering reference value for each sample value, which triggering reference value is determined from sample values preceding a time of triggering and from consecutively generated triggering reference values in the event of triggering;

subtracting from each sample value the triggering reference value corresponding to each sample value of each series, thus obtaining one difference series of difference values per phase, wherein:

a triggering device generates the triggering reference values to form the difference values from derived voltage signals, in the triggering device, a triggering neural network with an input layer, a hidden layer, and an output layer with a single triggering output neuron is assigned to each phase conductor of the power transmission line to be monitored, the triggering neural network assigned to each phase conductor has a behavior taught by coaching through simulation of voltages for different load conditions of the power transmission line to be monitored, successively sampled, normalized values of the voltage on the respective phase conductor of the power transmission line are applied simultaneously to the different neurons of the input layer of each triggering neural network, a subsequently sampled normalized value of the voltage on the respective phase conductor is compared to the output signal of the triggering output neuron of the triggering neural network, and the output signal of the triggering output neuron of the triggering neural network, present in the respective phase conductor over the output signal of the triggering output neuron of the respective triggering neural network when the normalized comparative value of the current in the respective phase conductor is exceeded and/or present below the output signal of the triggering output neuron of the respective other neural network when the normalized comparative value of the voltage on the same phase conductor is not reached, and the simultaneously present output signals of the triggering output neurons of the other triggering neural networks, are used as triggering reference values;

supplying the difference values of all difference series to input neurons of the triggering neural network so that the output signal of the output neuron of the neural network exceeds a predefined upper threshold value in the event of a short-circuit in a first direction and is below a predefined lower threshold value in the event of a short-circuit in a second direction; and generating a direction signal when the output signal of the output neuron reaches one of the upper and lower threshold values.

2. The method according to claim 1, wherein:

in order to detect a short-circuit between the power transmission line to be monitored and another power transmission line, the neural network is trained, by simulation of short-circuits at different points between the two power transmission lines, so that the output signal of the output neuron assumes a predefined intermediate value between the upper and lower threshold values in the event of a short-circuit between the two power transmission lines, and a parallel fault signal is generated when the output signal is substantially equal to the predefined intermediate value.

3. The method according to claim 1, wherein:

a current triggering device generates current triggering reference values which are used to form additional difference values from the derived current signals, the additional difference values being supplied to the neural network, in which current triggering device a current triggering neural network with an input layer, a hidden layer, and an output layer with a triggering output neuron is assigned to each phase conductor of the power transmission line to be monitored;

the current triggering neural network assigned to each phase conductor has a triggering behavior taught by coaching through simulation of currents for different load conditions of the power transmission line to be monitored;

successively sampled normalized values of the current in the respective phase conductor of the power transmission line are applied to respective neurons of the input layer of each current triggering neural network, and then a subsequent sampled, normalized value of the current in the respective phase conductor is compared to the output signal of the triggering output neuron; and the output signal of the triggering output neuron, present in the respective phase conductor over the output signal of the triggering output neuron of the respective current triggering neural network when the normalized comparative value of the current in the respective phase conductor is exceeded, and the simultaneously present output signals of the triggering output neuron of the other current triggering neural network are used as the current triggering reference values.

4. The method according to claim 3, wherein each current triggering neural network includes one input layer with five neurons and one hidden layer with five neurons.

5. The method according to claim 1, wherein each triggering neural network includes one input layer with five neurons and one hidden layer with five neurons.

6. The method according to claim 1, wherein the neural network includes 24 input neurons, a first hidden layer with 20 neurons and a second hidden layer with 12 neurons.

7. The method of claim 1, wherein the sampled current and voltage signals are normalized separately for each phase.

8. The method of claim 1, wherein the neural network includes an input layer and at least two hidden layers, the input layer including a plurality of input neurons, and wherein the difference values are supplied at the same time to the plurality of input neurons.

9. A method for generating a direction signal indicating the direction of a short-circuit current in relation to a control point on a power transmission line to be monitored, the method comprising the steps of:

sampling current and voltage signals derived from phase currents and phase voltages of the power transmission line;

normalizing the sampled current and voltage signals to obtain a series of normalized sample values for each phase;

using a triggering device which includes at least one triggering neural network to generate a triggering reference value for each sample value, which triggering reference value being determined from sample values preceding a time of triggering and from consecutively generated triggering reference values in the event of triggering;

subtracting, in the event of triggering, the triggering reference value corresponding to a series from the sample values of the series, thus obtaining one difference series of difference values per phase;

supplying the difference values of all difference series to input neurons of a neural network which is taught by coaching by simulation of different types of short-circuits at different points of the power transmission line, so that an output signal of an output neuron exceeds a predefined upper threshold value in the event of a short-circuit in a first direction and is below a predefined lower threshold value in the event of a short-circuit in a second direction; and generating a direction signal when the output signal of the output neuron reaches one of the upper and lower threshold values.

10. The method according to claim 9, wherein:

in order to detect a short-circuit between the power transmission line to be monitored and another power transmission line, the neural network is trained, by simulation of short-circuits at different points between the two power transmission lines, so that the output signal of the output neuron assumes a predefined intermediate value between the upper and lower threshold values in the event of a short-circuit between the two power transmission lines, and a parallel fault signal is generated when the output signal is substantially equal to the predefined intermediate value.

11. The method according to claim 9, wherein each triggering neural network includes an input layer, a hidden layer, and an output layer with a triggering output neuron.

12. The method according to claim 11, wherein:

a triggering neural network is assigned to each phase conductor of the power transmission line to be monitored;

the triggering neural network assigned to each phase conductor has a triggering behavior taught by coaching through simulation of currents for different load conditions of the power transmission line to be monitored;

successively sampled normalized values of the current in the respective phase conductor of the power transmission line are applied to respective neurons of the input layer of each triggering neural network, and then a subsequent sampled, normalized value of the current in the respective phase conductor is compared to the output signal of the triggering output neuron; and when the normalized comparative value of the current in the respective phase conductor is exceeded the output signal of the triggering output neuron of the triggering neural network is used as the triggering reference value.

13. The method according to claim 12, wherein each triggering neural network includes one input layer with five neurons and one hidden layer with five neurons.

14. The method according to claim 11, wherein:

a triggering neural network is assigned to each phase conductor of the power transmission line to be monitored;

the triggering neural network assigned to each phase conductor has a behavior taught by coaching through simulation of voltages for different load conditions of the power transmission line to be monitored;

successively sampled, normalized values of the voltage on the respective phase conductor of the power transmission line are applied simultaneously to the different neurons of the input layer of each triggering neural network, a subsequently sampled normalized value of the voltage on the respective phase conductor is compared to the output signal of the triggering output neuron of the triggering neural network, and when the normalized comparative value of the current in the respective phase conductor is exceeded or when the normalized comparative value of the voltage on the same phase conductor is not reached, the output signal of the triggering output neuron of the triggering neural network is used a triggering reference value.

15. The method according to claim 14, wherein each triggering neural network includes one input layer with five neurons and one hidden layer with five neurons.

16. The method according to claim 9, wherein the neural network includes 24 input neurons, a first hidden layer with 20 neurons and a second hidden layer with 12 neurons.

* * * * *